United States Patent
Lee et al.

(10) Patent No.: US 9,696,753 B2
(45) Date of Patent: Jul. 4, 2017

(54) TOUCH PANEL

(71) Applicant: Samsung Display Co. Ltd., Yongin, Gyeonggi-Do (KR)

(72) Inventors: Joo Hyung Lee, Gwacheon-si (KR); Ja Seung Ku, Seoul (KR); Hyoung Wook Jang, Anyang-si (KR); Soon Sung Ahn, Cheonan-si (KR)

(73) Assignee: Samsung Display Co., Ltd. (KR)

(*) Notice: Subject to any disclaimer, the term of this patent is extended or adjusted under 35 U.S.C. 154(b) by 35 days.

(21) Appl. No.: 14/744,731

(22) Filed: Jun. 19, 2015

(65) Prior Publication Data
US 2016/0197610 A1 Jul. 7, 2016

(30) Foreign Application Priority Data

Jan. 7, 2015 (KR) .................. 10-2015-0001774

(51) Int. Cl.
*G06F 3/041* (2006.01)
*G06F 1/16* (2006.01)
*G06F 3/044* (2006.01)

(52) U.S. Cl.
CPC .......... *G06F 1/16* (2013.01); *G06F 3/044* (2013.01); *G06F 2203/04111* (2013.01); *G06F 2203/04112* (2013.01)

(58) Field of Classification Search
None
See application file for complete search history.

(56) References Cited

U.S. PATENT DOCUMENTS

| 2009/0002337 A1* | 1/2009 | Chang ............... G06F 3/044 345/174 |
| 2010/0245285 A1 | 9/2010 | Wang et al. |
| 2011/0025639 A1 | 2/2011 | Trend et al. |
| 2011/0210935 A1 | 9/2011 | Chuang |
| 2015/0084907 A1* | 3/2015 | Burberry ............ G06F 3/046 345/174 |

FOREIGN PATENT DOCUMENTS

| KR | 2013-0044058 A | 5/2013 |
| KR | 2013-0061854 A | 6/2013 |

* cited by examiner

*Primary Examiner* — Joseph Haley
(74) *Attorney, Agent, or Firm* — Innovation Counsel LLP (57) ABSTRACT

A touch panel with improved optical characteristics, thin-film characteristics, durability, and reliability is presented. The touch panel includes: a plurality of first sensing electrodes located on a surface of the substrate and arranged along a first direction and a plurality of second sensing electrodes arranged along a second direction intersecting the first direction; a first connector connecting the first sensing electrodes along the first direction; an insulating layer pattern which is disposed on the first connector; and a second connector which is disposed on the insulating layer pattern, intersects the first connector to be insulated from the first connector, and connects the second sensing electrodes along the second direction, wherein at least one of the first sensing electrodes includes: a first metal conductive pattern disposed on the surface of the substrate and includes a plurality of first fine metal lines; and a first transparent conductive pattern which is disposed on the first metal conductive pattern, wherein the first transparent conductive pattern includes a first portion that overlaps the first connector.

20 Claims, 8 Drawing Sheets

TOUCH PANEL

This application claims priority from Korean Patent Application No. 10-2015-0001774 filed on Jan. 7, 2014 in the Korean Intellectual Property Office, the disclosure of which is incorporated herein by reference in its entirety.

BACKGROUND

1. Related Field

The present invention relates to a touch panel.

2. Description of the Related Art

Touch panels are sometimes incorporated into liquid crystal displays (LCDs) or organic light-emitting display devices as input devices. A touch panel is a device touched by a user's finger or an object such as a pen to input a command. Touch panels are classified into resistive, photosensing, and capacitive touch panels.

Of these different types of touch panels, a capacitive touch panel detects a touch signal by sensing a change in capacitance. The capacitor is formed by a sensing electrode having conductivity and an adjacent sensing electrode. When a user's finger or an object touches the touch panel, a change in capacitance is triggered.

The capacitive touch panel may include, for example, a plurality of sensing electrodes and connectors that connect the sensing electrodes.

Touch panels are often coupled to image display devices such as LCDs or organic light-emitting displays in consumer products. Therefore, high transparency, thin-film characteristics, and durability are desirable.

SUMMARY

Aspects of the inventive concept provide a touch panel with improved optical characteristics, thin-film characteristics, durability, and reliability.

However, aspects of the inventive concept are not restricted to the one set forth herein. The above and other aspects of the inventive concept will become more apparent to one of ordinary skill in the art to which the disclosure pertains by referencing the detailed description given below.

According to an exemplary embodiment, there is provided a touch panel including: a substrate; a plurality of first sensing electrodes which are located on a surface of the substrate and arranged along a first direction and a plurality of second sensing electrodes which are arranged along a second direction intersecting the first direction; a first connector connecting the first sensing electrodes along the first direction; an insulating layer pattern disposed on the first connector; and a second connector disposed on the insulating layer pattern, overlapping the first connector and is insulated from the first connector, the second connector connecting the second sensing electrodes along the second direction, wherein each of the first sensing electrodes comprises: a first metal conductive pattern which is disposed on the surface of the substrate and comprises a plurality of first fine metal lines; and a first transparent conductive pattern disposed on the first metal conductive pattern, wherein the first transparent conductive pattern comprises a first portion that overlaps the first connector.

According to another exemplary embodiment, there is provided a touch panel including: a substrate; a plurality of first sensing electrodes disposed on a surface of the substrate and arranged along a first direction and a plurality of second sensing electrodes arranged along a second direction intersecting the first direction; a first connector connecting the first sensing electrodes along the first direction; an insulating layer pattern disposed on the first connector; and a second connector disposed on the insulating layer pattern, overlapping the first connector and is insulated from the first connector, the second connector connecting the second sensing electrodes along the second direction, wherein at least one of the first sensing electrodes comprises: a first metal conductive pattern which is disposed on the surface of the substrate and comprising a plurality of first fine metal lines; and a first transparent conductive pattern disposed on the first metal conductive pattern, wherein the insulating layer pattern comprises a first portion disposed on the first transparent conductive pattern.

The foregoing general description and the following detailed description are exemplary and explanatory and are intended to provide further explanation of the claimed subject matter.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION

In the following description, for the purposes of explanation, numerous specific details are set forth in order to provide a thorough understanding of various exemplary embodiments. It should be apparent, however, that various exemplary embodiments may be practiced without these specific details or with one or more equivalent arrangements. In other instances, well-known structures and devices are shown in block diagram form in order to avoid unnecessarily obscuring various exemplary embodiments.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
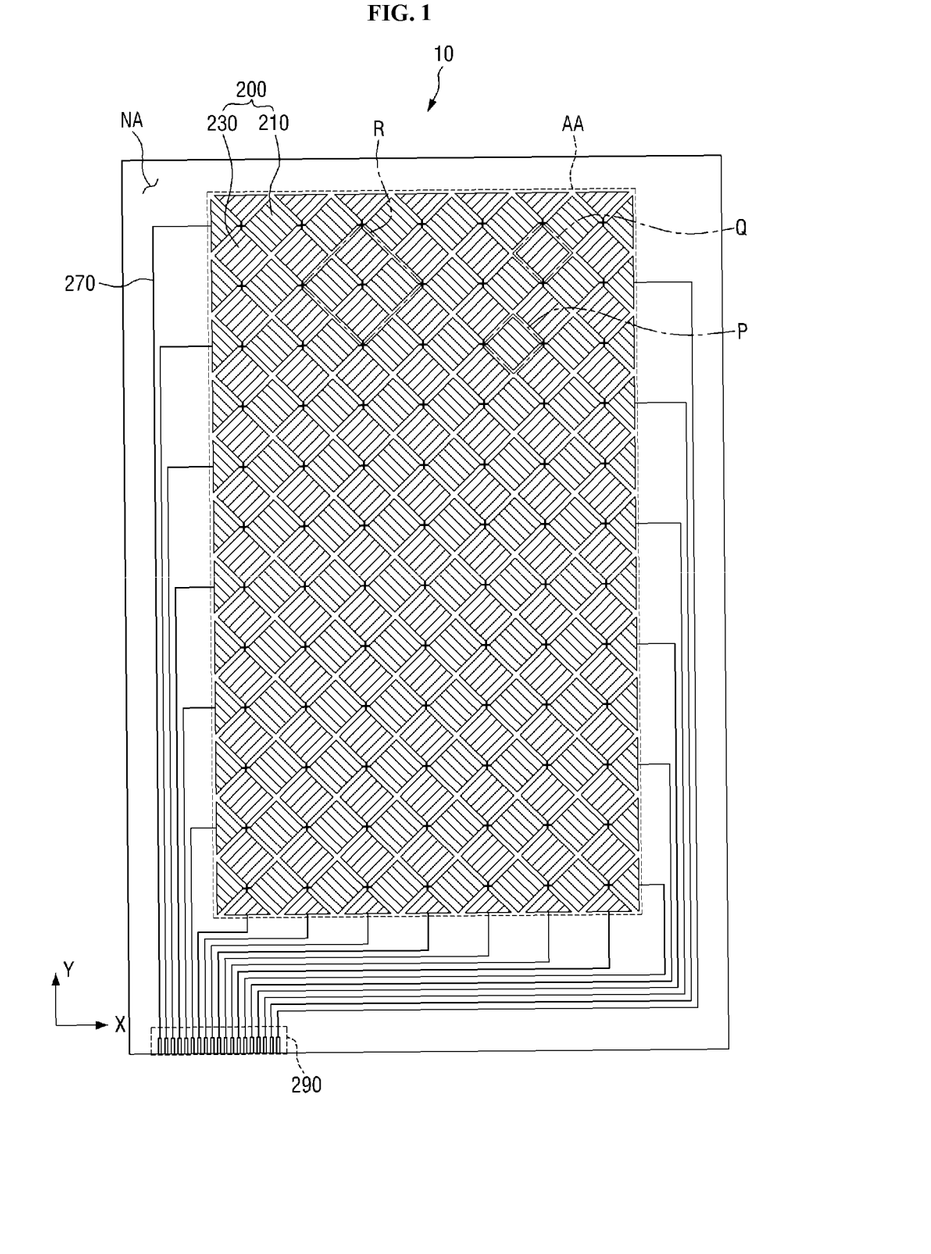
FIG. 1 is a schematic plan view of a touch panel according to an embodiment of the present inventive concept.
Figure 2:
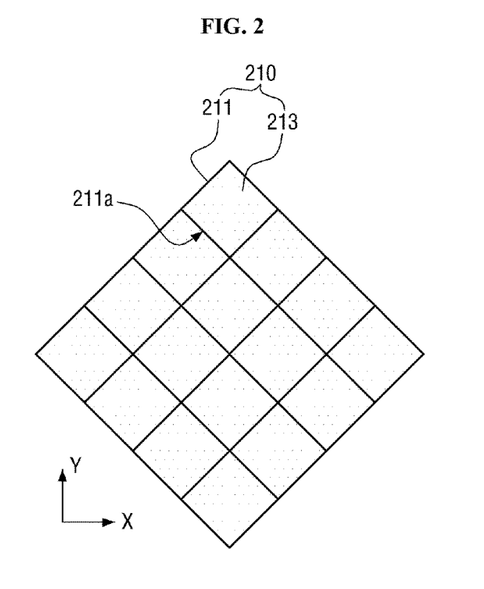
FIG. 2 is an enlarged plan view of a portion 'P' of FIG. 1.
Figure 3:
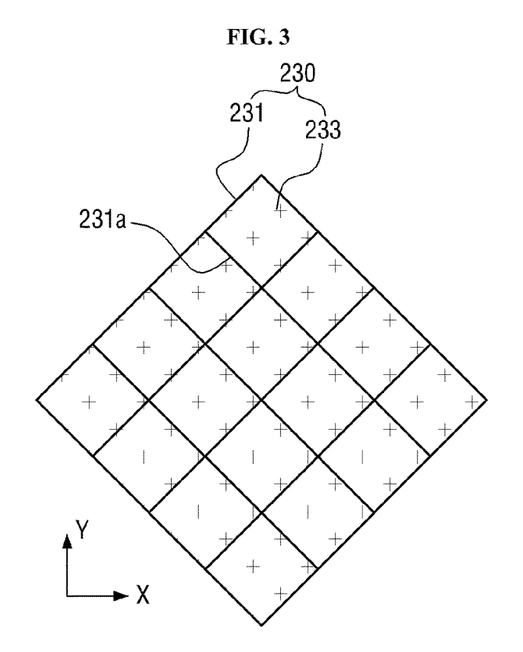
FIG. 3 is an enlarged plan view of a portion 'Q' of FIG. 1.
Figure 4:
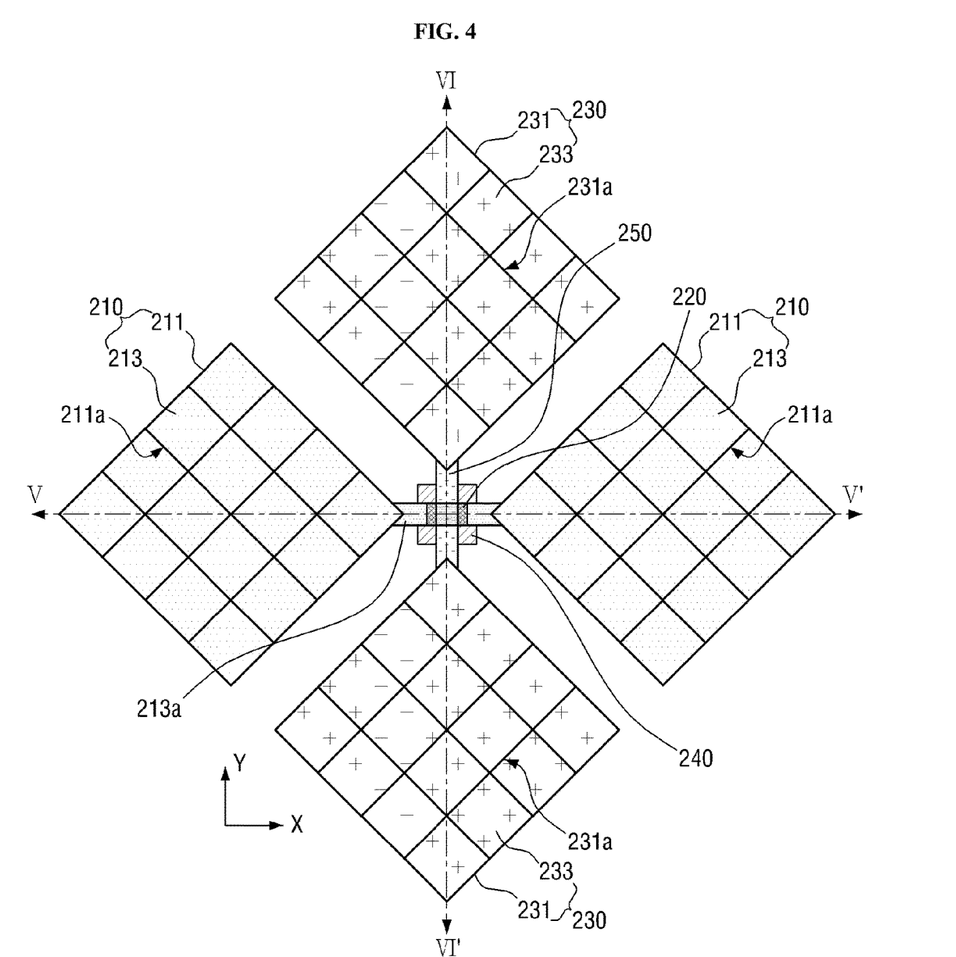
FIG. 4 is an enlarged plan view of a portion 'R' of FIG. 1.
Figure 5:
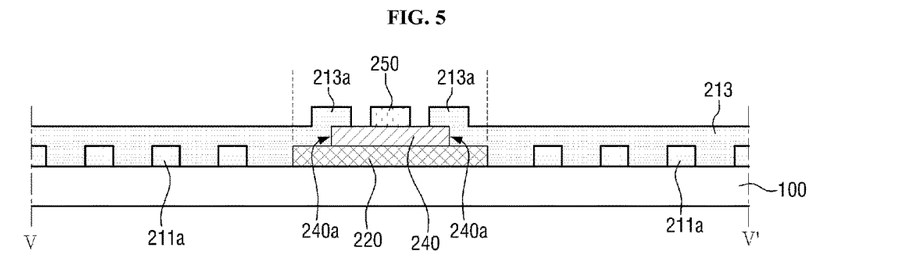
FIG. 5 is a cross-sectional view of the touch panel taken along the line V-V' of FIG. 4.
Figure 6:
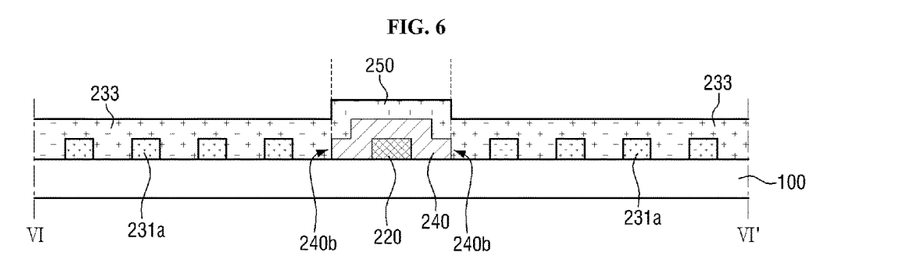
FIG. 6 is a cross-sectional view of the touch panel taken along the line VI-VI' of FIG. 4.

FIG. 1 is a schematic plan view of a touch panel 10 according to an embodiment of the inventive concept. FIG. 2 is an enlarged plan view of a portion 'P' of FIG. 1. FIG. 3 is an enlarged plan view of a portion 'Q' of FIG. 1. FIG. 4 is an enlarged plan view of a portion 'R' of FIG. 1. FIG. 5 is a cross-sectional view of the touch panel 10 taken along the line V-V' of FIG. 4. FIG. 6 is a cross-sectional view of the touch panel 10 taken along the line VI-VI' of FIG. 4.

Referring to FIGS. 1 through 6, the touch panel 10 according to the current embodiment may include a substrate 100, a plurality of sensing electrodes 200, a first connector 220, an insulating layer pattern 240, a second connector 250, and a plurality of wiring lines 270.

The sensing electrodes 200, the first connector 220, the insulating layer pattern 240, the second connector 250, and the wiring lines 270 may be disposed on a surface (e.g., a top surface) of the substrate 100.

The substrate 100 may be made of a transparent insulating material. In some embodiments, the transparent insulating material may be, but is not limited to, any one of tempered glass, acrylic resin, polyethylene terephthalate (PET), polycarbonate (PC), polyimide (PI), polyethersulfone (PES), polymethly methacrylate (PMMA), polyethylene naphthalate (PEN), metal foil, fiber reinforced plastic (FRP), silicon rubber, and cyclic polyolefin (COP). The substrate 100 may be rigid. However, the present disclosure is not limited thereto, and the substrate 100 may also be flexible. The substrate 100 may be a flexible substrate.

As illustrated in FIGS. 1 through 6, the substrate 100 may include a sensing area AA and a peripheral area NA defined outside the sensing area AA. The sensing area AA is an area for sensing a touch position of an object such as a finger or a stylus pen. The sensing electrodes 200, the first connector 220, the insulating layer pattern 240, and the second connector 250 may be located on the surface (e.g., the top surface) of the substrate 100 in the sensing area AA.

The peripheral area NA is located outside the sensing area AA. The wiring lines 270 connecting the sensing electrodes 200 to a pad unit 290 may be located on the surface of the substrate 100 in the peripheral area NA.

A driver circuit board (not illustrated) or a touch controller (not illustrated) for driving the touch panel 10 may be electrically connected to the pad unit 290.

The sensing electrodes 200 may be located on the surface of the substrate 100 in the sensing area AA. The sensing electrodes 200 may include a plurality of first sensing electrodes 210 arranged in a first direction (e.g., an X-axis direction) and a plurality of second sensing electrodes 230 arranged in a second direction (e.g., a Y-axis direction) intersecting (e.g., perpendicular to) the first direction. In FIG. 1, the first sensing elect5rodes 210 and the second sensing electrodes 230 are indicated by hash lines extending in different directions. In the embodiment shown, where the sensing electrodes 210, 230 have rectangular shapes, each side of a first sensing electrode 210 is adjacent to a side of a second sensing electrode 230, and vice versa. As shown in FIGS. 2, 3, 4, 5, and 6, the first sensing electrodes have a first transparent conductive pattern layer as the top layer, while the second sensing electrodes have a second connector as the top layer in plan view.

The first sensing electrodes 210 and the second sensing electrodes 230 may be separated from each other. For example, the first sensing electrodes 210 and the second sensing electrodes 230 may be physically separated from each other and may not directly contact each other. Further, the first sensing electrodes 210 and the second sensing electrodes 230 may be electrically insulated from each other.

The first sensing electrodes 210 and the second sensing electrodes 230 may be located at the same level in a cross-sectional view. When the first and second sensing electrodes 210 and 230 are located at the same level, they may be located on the same layer. In some embodiments, the first sensing electrodes 210 and the second sensing electrodes 230 may be formed directly on the surface of the substrate 100 to contact the substrate 100.

Each of the first sensing electrodes 210 may include a first metal conductive metal pattern 211 located on the surface of the substrate 100 and a first transparent conductive pattern 213 located on the first metal conductive pattern 211.

The first metal conductive pattern 211 may include a plurality of first fine metal lines 211a. The first fine metal lines 211a may be arranged regularly or irregularly to form a mesh shape, and spaces may be formed between the first fine metal lines 211a.

The first metal conductive pattern 211 may be made of a conductive material, and the conductive material may be a metal. In an example, the metal may be, but is not limited to, a metal with low resistivity such as silver (Ag), gold (Au), platinum (Pt), nickel (Ni), aluminum (Al), copper (Cu), chrome (Cr), or molybdenum (Mo).

The first transparent conductive pattern 213 may be located on the first metal conductive pattern 211. When seen in plan view or from above the touch panel 10, the first transparent conductive pattern 213 may completely cover the first fine metal lines 211a. In other words, the first fine metal lines 211a may be completely covered by the first transparent conductive pattern 213. Accordingly, the first fine metal lines 211a may not be exposed. Therefore, the first metal conductive pattern 211 may be protected by the first transparent conductive pattern 213. Accordingly, the damage to the first metal conductive pattern 211 including the first fine metal lines 211a can be prevented, thereby improving the reliability and durability of the touch panel 10.

When each of the first sensing electrodes 210 consists of two layers (i.e., the first metal conductive pattern 211 and the first transparent conductive pattern 213), the touch panel 10 can have a uniform distribution of electric field over a large area than when each of the first sensing electrodes 210 consists of a single layer (i.e., the first metal conductive pattern 211). In addition, even when a short circuit occurs in some of the first fine metal lines 211a of the first metal conductive pattern 211, the touch panel 10 can still sense a touch. This improves the reliability of the touch panel 10.

In some embodiments, the first transparent conductive pattern 213 may fill the spaces between the first fine metal lines 211a. Accordingly, when seen in plan view or from above the touch panel 10, the surface of the substrate 100 may not be exposed.

The first transparent conductive pattern 213 may be made of an optically transparent conductive material. Here, the optically transparent conductive material denotes not only a conductive material that is transparent but also a conductive material that is opaque but is perceived as transparent when seen with the naked eye because basic constituent units of the conductive material are very small and arranged at an appropriate density. In an example, the optically transparent conductive material may be, but is not limited thereto, a transparent conductive oxide such as indium tin oxide (ITO), indium zinc oxide (IZO), zinc oxide (ZO), aluminum-doped zinc oxide (AZO) or gallium zinc oxide (GZO) or a conductor such as carbon nanotube (CNT), graphene or a conductive polymer.

The first transparent conductive pattern 213 may include a first portion 213a which extends onto the first connector 220 which will be described later. When seen in plan view or from above the touch panel 10, the first portion 213a may overlap the first connector 220.

Each of the second sensing electrodes 230 may include a second metal conductive metal pattern 231 located on the surface of the substrate 100 and a second transparent conductive pattern 233 located on the second metal conductive pattern 231.

The second metal conductive pattern 231 may include a plurality of second fine metal lines 231a. The second fine metal lines 231a may be arranged regularly or irregularly to form a mesh shape, and spaces may be formed between the second fine metal lines 231a.

The second metal conductive pattern 231 may be made of a conductive material, and the conductive material may be a metal. Examples of the metal that forms the second metal conductive pattern 231 are the same as those mentioned above in the description of the first metal conductive pattern 211. In some embodiments, the second metal conductive pattern 231 may be formed of the same material as the first metal conductive pattern 211 in the same process. In addition, in some embodiments, the second metal conductive pattern 231 may be located at the same level as the first metal conductive pattern 211.

The second transparent conductive pattern 233 may be located on the second metal conductive pattern 231. In plan view or from above the touch panel 10, the second transparent conductive pattern 233, like the first transparent conductive pattern 213, may completely cover the second fine metal lines 231a. Therefore, the second metal conductive pattern 231 may be protected by the second transparent conductive pattern 233. Accordingly, the damage to the second metal conductive pattern 231 including the second fine metal lines 231a can be prevented.

The second transparent conductive pattern 233 may be made of an optically transparent conductive material. In an example, the optically transparent conductive material that forms the second transparent conductive pattern 233 may be, but is not limited thereto, a transparent conductive oxide such as ITO, IZO, ZO, AZO or GZO or a conductor such as CNT, graphene or a conductive polymer. In some embodiments, the second transparent conductive pattern 233 may be formed of the same material as the first transparent conductive pattern 213 in the same process. In addition, in some embodiments, the second transparent conductive pattern 233 may be located at the same level as the first transparent conductive pattern 213.

The first connector 220 may be located on the surface of the substrate 100 in the sensing area AA. The first connector 220 may electrically connect the first sensing electrodes 210 neighboring each other along the first direction (e.g., the X-axis direction).

The first connector 220 may be made of a conductive material, for example a metal. In an example, the metal may be, but is not limited to, a metal with low resistivity such Ag, Au, Pt, Ni, Al, Cu, Cr, or Mo. In some embodiments, the first connector 220 may be formed of the same material as the first metal conductive pattern 211 in the same process. In addition, in some embodiments, the first connector 220 may be located at the same level as the first metal conductive pattern 211.

The insulating layer pattern 240 may be located on the first connector 220 to cover the first connector 220.

A width of the insulating layer pattern 240 in the first direction (the X-axis direction) may be smaller than a width of the first connector 220 in the first direction (the X-axis direction). A width of the insulating layer pattern 240 in the second direction (the Y-axis direction) may be greater than a width of the first connector 220 in the second direction (the Y-axis direction). Therefore, the insulating layer pattern 240 may completely cover the first connector 220 along the second direction (the Y-axis direction).

The insulating layer pattern 240 may be made of an insulating material. In some embodiments, the insulating material may be an organic insulating material. In an exemplary embodiment, the organic insulating material may be positive photosensitive resin. The positive photosensitive resin may include, but not limited to, binder resin exemplified by alkali-soluble resin, a photosensitizer having various structures, and a solvent.

The first portion 213a of the first transparent conductive pattern 213 may be located on an upper edge of the insulating layer pattern 240. That is, the first transparent conductive pattern 213 may extend onto the first connector 220 and the insulating layer pattern 240. Therefore, a side surface 240a of the insulating layer pattern 240 in the first direction (the X-axis direction) may directly contact the first portion 213a. In addition, a side surface 240b of the insulating layer pattern 240 in the second direction (the Y-axis direction) may directly contact the second transparent conductive pattern 233.

The second connector 250 may be located on the insulating layer pattern 240 and intersect the first connector 220 to be insulated from the first connector 220. The second connector 250 may be separated from the first portion 213a. The second connector 250 may electrically connect the second sensing electrodes 230 neighboring each other along the second direction (e.g., the Y-axis direction).

The second connector 250 may be made of an optically transparent conductive material. Examples of the optically transparent conductive material are the same as those mentioned above in the description of the second transparent conductive pattern 233. The second connector 250 may be made of the same material as the second transparent conductive pattern 233 and may be formed integrally with the second transparent conductive pattern 233 in the same process step.

According to the present disclosure, the first metal conductive pattern 211 may be protected by the first transparent conductive pattern 213, and the second metal conductive pattern 231 may be protected by the second transparent conductive pattern 233. In addition, the first connector 220 may be completely covered by the insulating layer pattern 240 and the first portion 213a. Therefore, the reliability and durability of the touch panel 10 can be improved.

Figure 7:
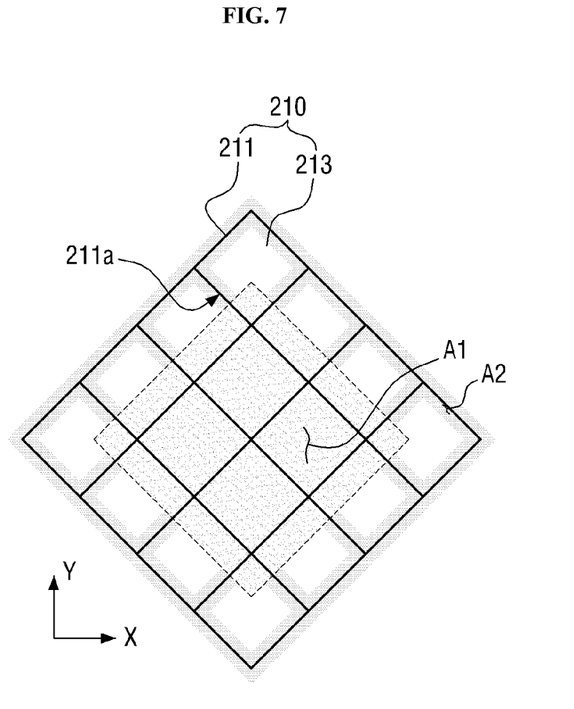
FIG. 7 is a plan view of a modified embodiment of a first sensing electrode illustrated in FIG. 2.

FIG. 7 is a plan view of a modified embodiment of the first sensing electrode 210 illustrated in FIG. 2.

Referring to FIGS. 1 through 7, a first sensing electrode 210 according to the modified embodiment may include a first area A1 and a second area A2 which have different densities of a first transparent conductive pattern 213 when seen in plan view. In an exemplary embodiment, the first transparent conductive pattern 213 may cover all of first fine metal lines 211a as illustrated in FIG. 7. The first transparent conductive pattern 213 may fill spaces between the first fine metal lines 211a in a central part of the first sensing electrode 210 but may not fill spaces between neighboring first fine metal lines 211a in an edge part of the first sensing electrode 210. The first transparent conductive pattern 213 may be distributed differently depending on which part of the first sensing electrode 210 it is disposed on. For example, there may be less of the first transparent conductive pattern 213 per unit area in a part of the first sensing electrode 210 that is adjacent to a neighboring second sensing electrode 230 than in the central part of the first sensing electrode 210.

Alternatively, unlike the illustration in FIG. 7, the amount per unit area of the first transparent conductive pattern 213 may be lower in the central part of the first sensing electrode 210 than in the edge part of the first sensing electrode 210.

That is, touch sensitivity can be adjusted by controlling the distribution of the first transparent conductive pattern 213 in each area.

Although not illustrated in the drawings, like the first sensing electrode 210, a second sensing electrode 230 may include two or more areas having different amounts per unit area of a second transparent conductive pattern 233.

Figure 8:
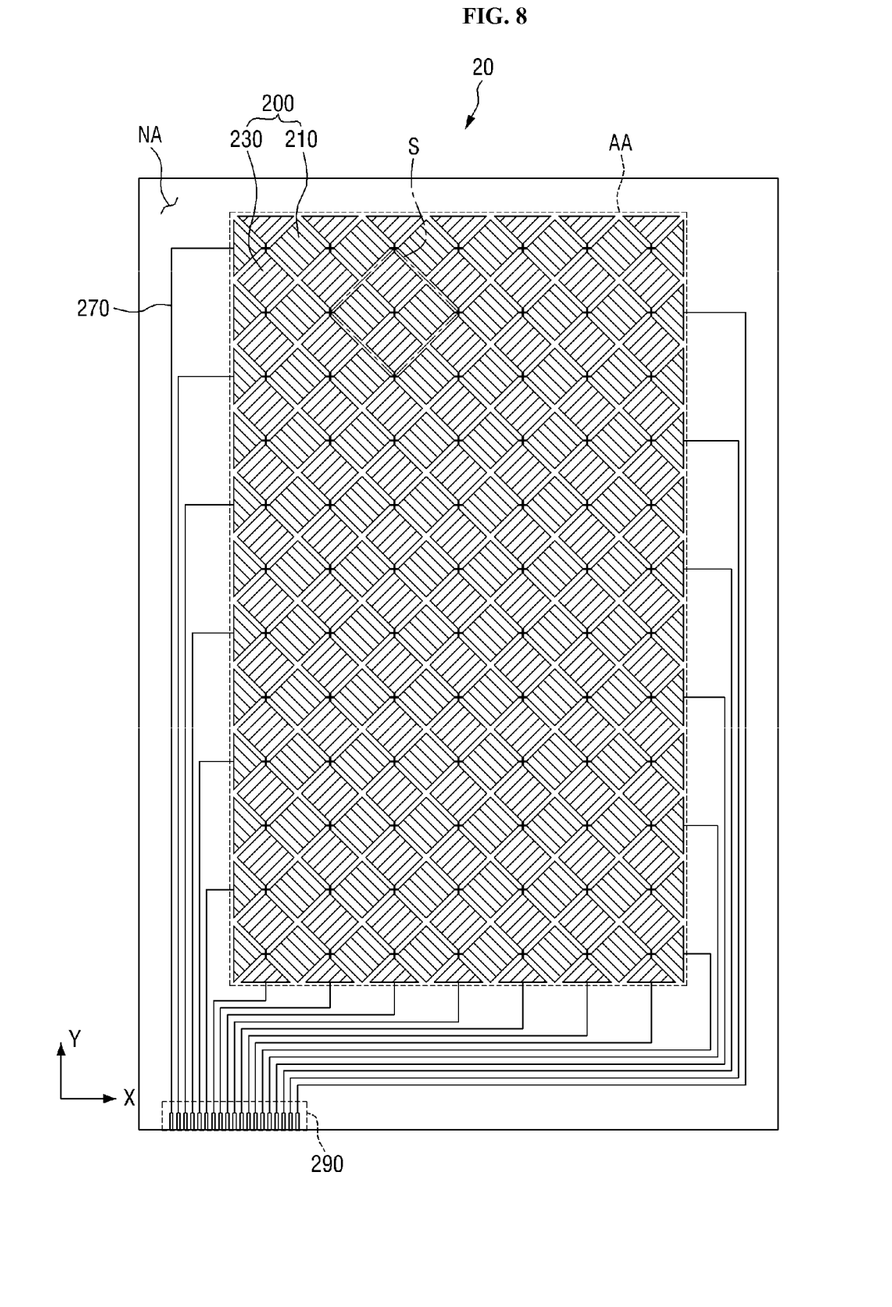
FIG. 8 is a schematic plan view of a touch panel according to another embodiment.
Figure 9:
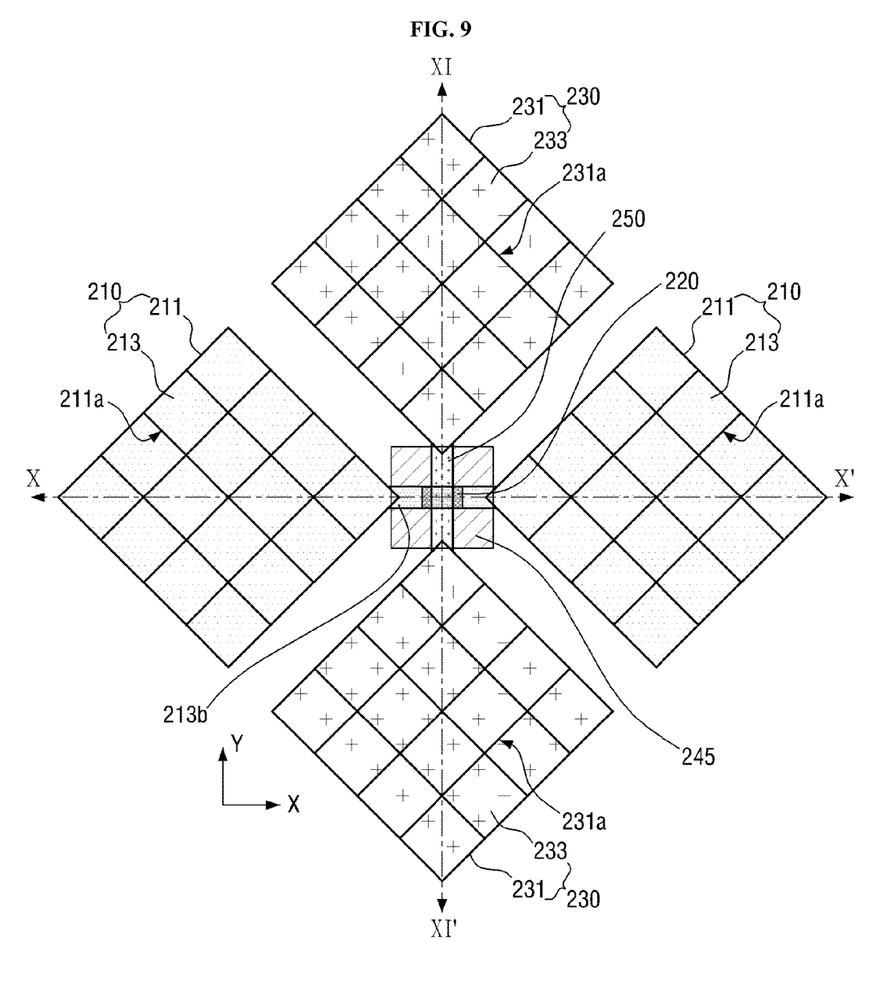
FIG. 9 is an enlarged plan view of a portion 'S' of FIG. 8.
Figure 10:
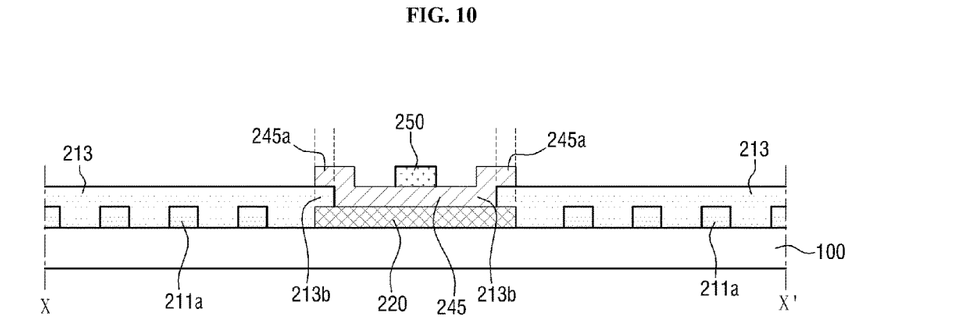
FIG. 10 is a cross-sectional view of the touch panel taken along the line X-X' of FIG. 9.
Figure 11:
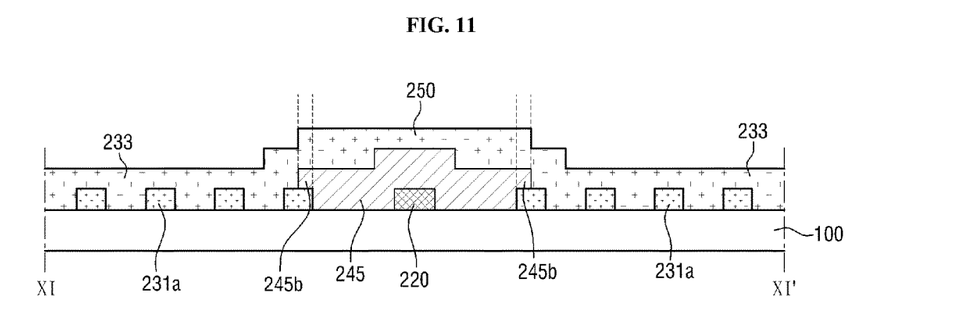
FIG. 11 is a cross-sectional view of the touch panel taken along the line XI-XI' of FIG. 9.

FIG. 8 is a schematic plan view of a touch panel 20 according to another embodiment. FIG. 9 is an enlarged plan view of a portion 'S' of FIG. 8. FIG. 10 is a cross-sectional view of the touch panel 20 taken along the line X-X' of FIG. 9. FIG. 11 is a cross-sectional view of the touch panel 20 taken along the line XI-XI' of FIG. 9. The touch panel 20 according to the current embodiment may be substantially the same as the touch panel 10 illustrated in FIGS. 1 through 6, except a first transparent conductive pattern 213 and an insulating layer pattern 245. For simplicity, the current embodiment will hereinafter be described, focusing mainly on differences with the previous embodiment.

Referring to FIGS. 8 through 10, the touch panel 20 according to the current embodiment may include a substrate 100, a plurality of sensing electrodes 200, a first connector 220, the insulating layer pattern 245, a second connector 250, and a plurality of wiring lines 270.

The first transparent conductive pattern 213 may include a portion 213b which extends onto the first connector 220. When seen in plan view or from above the touch panel 20, the portion 213b may overlap the first connector 220.

The insulating layer pattern 245 may be located on the first connector 220 to cover the first connector 220. The insulating layer pattern 245 may include a first portion 245a, and the first portion 245a of the insulating layer pattern 245 may be located on the portion 213b of the first transparent conductive pattern 213. That is, when seen in plan view, the first portion 245a of the insulating layer pattern 245 may overlap the portion 213b of the first transparent conductive pattern 213.

In some embodiments, the insulating layer pattern 245 may further include a second portion 245b, and the second portion 245b may partially overlap a second metal conductive pattern 231.

According to the current embodiment, the first connector 220 may be completely covered by the insulating layer pattern 245 and the portion 213b of the first transparent conductive pattern 213. Therefore, the first connector 220 may not be exposed, thereby improving the reliability and durability of the touch panel 20.

Embodiments of the inventive concept provide at least one of the following advantages.

For example, a touch panel with improved optical characteristics, thin-film characteristics, durability, and reliability can be provided.

However, the effects of the embodiments are not restricted to the one set forth herein. The above and other effects of the present invention will become more apparent to one of daily skill in the art to which the present disclosure pertains by referencing the claims.

While the present inventive concept has been particularly shown and described with reference to exemplary embodiments thereof, it will be understood by those of ordinary skill in the art that various changes in form and detail may be made therein without departing from the spirit and scope of the present inventive concept as defined by the following claims. The exemplary embodiments should be considered in a descriptive sense only and not for purposes of limitation.

What is claimed is:
1. A touch panel comprising:
a substrate;
a plurality of first sensing electrodes which are located on a surface of the substrate and arranged along a first direction and a plurality of second sensing electrodes which are arranged along a second direction intersecting the first direction;
a first connector connecting the first sensing electrodes along the first direction;
an insulating layer pattern disposed on the first connector; and
a second connector disposed on the insulating layer pattern, overlapping the first connector and is insulated from the first connector, the second connector connecting the second sensing electrodes along the second direction,
wherein at least one of the first sensing electrodes comprises:
a first metal conductive pattern disposed on the surface of the substrate and comprising a plurality of first fine metal lines; and
a first transparent conductive pattern disposed on the first metal conductive pattern,
wherein the first transparent conductive pattern comprises a first portion that overlaps the first connector;
wherein at least one of the second sensing electrodes comprises:
a second metal conductive pattern disposed on the surface of the substrate and comprising a plurality of second fine metal lines; and
a second transparent conductive pattern disposed on the second metal conductive pattern.

2. The touch panel of claim 1, wherein at least part of the first portion is disposed on the insulating layer pattern.

3. The touch panel of claim 1, wherein the first transparent conductive pattern covers the first fine metal lines.

4. The touch panel of claim 1, wherein the first connector is formed of the same material as the first metal conductive pattern.

5. A touch panel comprising:
a substrate;
a plurality of first sensing electrodes which are located on a surface of the substrate and arranged along a first direction and a plurality of second sensing electrodes which are arranged along a second direction intersecting the first direction;
a first connector connecting the first sensing electrodes along the first direction;
an insulating layer pattern disposed on the first connector; and
a second connector disposed on the insulating layer pattern, overlapping the first connector and is insulated from the first connector, the second connector connecting the second sensing electrodes along the second direction,
wherein at least one of the first sensing electrodes comprises:
a first metal conductive pattern disposed on the surface of the substrate and comprising a plurality of first fine metal lines; and
a first transparent conductive pattern disposed on the first metal conductive pattern,
wherein the first transparent conductive pattern comprises a first portion that overlaps the first connector, and
wherein at least one of the first sensing electrodes comprises a first area and a second area that have different amounts of the first transparent conductive pattern per unit area.

6. The touch panel of claim 1, wherein each of the second sensing electrodes comprises:

a second metal conductive pattern disposed on the surface of the substrate and comprising a plurality of second fine metal lines; and
a second transparent conductive pattern disposed on the second metal conductive pattern.

7. The touch panel of claim 6, wherein the second transparent conductive pattern covers the second fine metal lines.

8. The touch panel of claim 6, wherein the second connector is formed of the same material as the second transparent conductive pattern.

9. The touch panel of claim 6, wherein the second connector is integrally formed with the second transparent conductive pattern.

10. The touch panel of claim 6, wherein the first metal conductive pattern and the second metal conductive pattern are formed of the same material, and the first transparent conductive pattern and the second transparent conductive pattern are formed of the same material.

11. A touch panel comprising:
a substrate;
a plurality of first sensing electrodes disposed on a surface of the substrate and arranged along a first direction and a plurality of second sensing electrodes which are arranged along a second direction intersecting the first direction;
a first connector connecting the first sensing electrodes along the first direction;
an insulating layer pattern disposed on the first connector; and
a second connector disposed on the insulating layer pattern, overlapping the first connector and is insulated from the first connector, the second connector connecting the second sensing electrodes along the second direction,
wherein at least one of the first sensing electrodes comprises:
a first metal conductive pattern disposed on the surface of the substrate and comprising a plurality of first fine metal lines; and
a first transparent conductive pattern disposed on the first metal conductive pattern,
wherein the insulating layer pattern comprises a first portion disposed on the first transparent conductive pattern;
wherein at least one of the second sensing electrodes comprises:
a second metal conductive pattern disposed on the surface of the substrate and comprising a plurality of second fine metal lines; and
a second transparent conductive pattern disposed on the second metal conductive pattern.

12. The touch panel of claim 11, wherein the first transparent conductive pattern comprises a portion which overlaps the first connector, wherein at least part of the portion overlaps the first portion of the insulating layer pattern.

13. The touch panel of claim 11, wherein the first transparent conductive pattern covers the first fine metal lines.

14. The touch panel of claim 11, wherein the first connector is formed of the same material as the first metal conductive pattern.

15. The touch panel of claim 11, wherein each of the second sensing electrodes comprises:
a second metal conductive pattern disposed on the surface of the substrate and comprising a plurality of second fine metal lines; and a second transparent conductive pattern disposed on the second metal conductive pattern.

16. The touch panel of claim 15, wherein the insulating layer pattern further comprises a second portion which overlaps the second metal conductive pattern.

17. The touch panel of claim 15, wherein the second transparent conductive pattern covers the second fine metal lines.

18. The touch panel of claim 15, wherein the second connector is formed of the same material as the second transparent conductive pattern.

19. The touch panel of claim 15, wherein the second connector is formed integrally with the second transparent conductive pattern.

20. The touch panel of claim 15, wherein the first metal conductive pattern and the second metal conductive pattern are formed of the same material, and the first transparent conductive pattern and the second transparent conductive pattern are formed of the same material.

* * * * *